(12) United States Patent
Edge (10) Patent No.: US 7,733,353 B2
(45) Date of Patent: Jun. 8, 2010

(54) SYSTEM AND METHOD FOR PROFILING DIGITAL-IMAGE INPUT DEVICES

(75) Inventor: Christopher J. Edge, St. Paul, MN (US)

(73) Assignee: Eastman Kodak Company, Rochester, NY (US)

(*) Notice: Subject to any disclaimer, the term of this patent is extended or adjusted under 35 U.S.C. 154(b) by 1210 days.

(21) Appl. No.: 11/303,071

(22) Filed: Dec. 14, 2005

(65) Prior Publication Data

US 2006/0181722 A1 Aug. 17, 2006

Related U.S. Application Data

(60) Provisional application No. 60/652,998, filed on Feb. 15, 2005, provisional application No. 60/653,011, filed on Feb. 15, 2005.

(51) Int. Cl.
| | |
|---|---|
| G09G 5/10 | (2006.01) |
| G09G 5/02 | (2006.01) |
| H04N 1/46 | (2006.01) |
| G03F 3/08 | (2006.01) |
| G06K 9/34 | (2006.01) |
| A61B 1/06 | (2006.01) |

(52) U.S. Cl. ............... 345/589; 345/606; 345/591; 345/643; 345/690; 348/70; 358/509; 358/518; 358/525; 382/162; 382/165; 382/167

(58) Field of Classification Search ............... 345/581, 345/589–591, 597, 600–601, 617–618, 606, 345/643, 660, 690, 48, 84; 348/70–71, 188, 348/651, 671, 674; 358/504, 509, 518–520, 358/523–525, 1.9; 382/162–165, 166–167, 382/169–170

See application file for complete search history.

(56) References Cited

U.S. PATENT DOCUMENTS

| | | | | |
|---|---|---|---|---|
| 5,363,318 | A * | 11/1994 | McCauley | 702/85 |
| 5,583,666 | A * | 12/1996 | Ellson et al. | 358/518 |
| 5,818,960 | A | 10/1998 | Gregory, Jr. et al. | 382/167 |
| 5,881,209 | A * | 3/1999 | Stokes | 358/1.9 |
| 6,075,888 | A * | 6/2000 | Schwartz | 382/167 |
| 6,108,442 | A | 8/2000 | Edge et al. | 382/167 |
| 6,459,425 | B1 * | 10/2002 | Holub et al. | 345/207 |
| 6,459,436 | B1 | 10/2002 | Kumada et al. | 345/590 |
| 6,522,778 | B1 * | 2/2003 | Tamagawa | 382/167 |
| 6,608,925 | B1 * | 8/2003 | Edge et al. | 382/162 |
| 6,654,150 | B1 | 11/2003 | Rozzi | 358/520 |
| 7,075,643 | B2 * | 7/2006 | Holub | 356/326 |

(Continued)

*Primary Examiner*—Wesner Sajous
(74) *Attorney, Agent, or Firm*—Nelson Adrian Blish (57) ABSTRACT

In a system and a method for profiling a digital-image input device, profiling of the digital-image input device is performed based at least on an image of a color chart and an estimated illumination of the color chart generated by comparing illumination of device-dependent coordinate values for the image of the color chart with illumination of device-independent coordinate values of the color chart. Because the estimated illumination of the color chart is performed on data pertaining to the color chart, the present invention may generate a profile without reference to data pertaining to scenery in the image outside of the color chart. Consequently, the present invention may generate a profile irrespective of the relative exposure of the color chart with respect to other scenery in the image.

21 Claims, 5 Drawing Sheets

U.S. PATENT DOCUMENTS

| | | | |
|---|---|---|---|
| 2001/0009404 A1* | 7/2001 | Paese et al. | 342/28 |
| 2002/0051159 A1 | 5/2002 | Tamagawa | 358/1.9 |
| 2002/0163657 A1* | 11/2002 | Bogdanowicz et al. | 358/1.9 |
| 2002/0167528 A1 | 11/2002 | Edge | 345/600 |
| 2003/0020703 A1* | 1/2003 | Holub | 345/207 |
| 2003/0053085 A1 | 3/2003 | Takemoto | 358/1.9 |
| 2003/0053092 A1* | 3/2003 | Ohkubo | 358/1.9 |
| 2003/0081060 A1* | 5/2003 | Zeng et al. | 347/43 |
| 2003/0098986 A1* | 5/2003 | Pop | 358/1.9 |
| 2004/0183813 A1 | 9/2004 | Edge | 345/600 |
| 2005/0264837 A1* | 12/2005 | Shimada | 358/1.9 |
| 2006/0232685 A1* | 10/2006 | Takemoto | 348/223.1 |

* cited by examiner

SYSTEM AND METHOD FOR PROFILING DIGITAL-IMAGE INPUT DEVICES

CROSS-REFERENCE TO RELATED APPLICATIONS

This application claims the benefit of: (a) U.S. Provisional Application No. 60/652,998, filed Feb. 15, 2005, the entire disclosure of which is hereby incorporated herein by reference, and (b) U.S. Provisional Application No. 60/653,011, filed Feb. 15, 2005, the entire disclosure of which is hereby incorporated herein by reference.

This application also is related to U.S. Non-Provisional patent application Ser. No. 11/311,581 titled "Color Correction Techniques for Correcting Color Profiles or a Device-Independent Color Space," filed Dec. 14, 2005, by Christopher Edge, the entire disclosure of which is hereby incorporated herein by reference.

FIELD OF THE INVENTION

This invention relates to profiling a digital-image input device using data representing an image of a color chart acquired by the digital-image input device. In particular, the invention is capable of generating a profile for the digital-image input device regardless of the relative exposure of the color chart with respect to other scenery in the acquired image.

BACKGROUND OF THE INVENTION

A digital-image input device, such as a digital camera or a scanner, converts light reflected from an object into digital data representing an image of the object. Typically, the digital data is divided into units, each unit describing the color of a portion, or pixel, of the image. Accordingly, the image may be described as a two-dimensional array of pixels (x, y). Further, each unit of digital data typically describes the color of a pixel by describing the amount, or intensity, of each primary color red, green, and blue, present in the pixel. For example, the digital data may indicate that the pixel at x=0 and y=0 has a red intensity of 200, a green intensity of 134, and a blue intensity of 100, where the intensity of each primary color is represented by eight bits. (Eight bits allows 256 combinations, so each primary color may have a value of 0-255, in this example, where 255 indicates the highest level of intensity and zero indicates no intensity, or black.)

The digital data produced by a digital-image input device is referred to herein as "device dependent data," because different digital-image input devices typically produce different digital data representing the same image acquired under the same conditions. For example, a first digital camera may indicate that a first pixel of an image has a red component of 200, whereas a second digital camera may indicate that the same pixel of an equivalent image taken under the same conditions has a red component of 202. For another example, the first digital camera may record the red in an apple as 200, and the second digital camera may record the red in the same part of the apple (as imaged under the same conditions) as 202. Because the device-dependent data generated by a digital-image input device typically specifies the red, green, and blue color components associated with each pixel, it is often referred to as "RGB" data.

The differences between device-dependent data from two different devices arise from minute differences in the imaging components in each device. These differences create problems when the images are output by a digital-image output device, such as a color ink-jet printer, a CRT monitor, or an LCD monitor. For example, the image of the apple taken by the first digital camera discussed above will appear differently than the image of the apple taken by the second digital camera when output to the same color ink-jet printer.

To further complicate matters, digital-image output devices also have the same types of discrepancies between each other that digital-image input devices have. For example, a user may want to view an image of a red square on one CRT monitor while a customer simultaneously views the same image on another CRT monitor. Assume that the digital-image input device used to image the red square recorded all pixels of the red square as red=200, green=0, and blue=0. Commonly, when the two monitors display the same image, each monitor displays a slightly different red color even though they have received the same digital data from the input device.

The same differences commonly exist when printing the same image to two different printers. However, it should be noted that the digital image data processed by printers typically describes each pixel in an image according to the amount, or intensity, of each secondary color cyan, magenta, and yellow, as well as black present in the pixel. Accordingly, the device-dependent digital image data processed by printers is referred to as "CMYK" data (as opposed to RGB device-dependent data associated with digital-image input devices.) (Monitors, on the other hand, display data in RGB format).

Color profiles provide a solution to the color discrepancies between devices discussed above. Each digital-image input device typically has its own color profile that maps its device-dependent data into device-independent data. Correspondingly, each digital-image output device typically has its own color profile that converts device-independent data into device-dependent data usable by the output device to print colors representative of the device-independent data. Device-independent data describes the color of pixels in an image in a universal manner, i.e., a device-independent color space. A device-independent color space assigns a unique value to every color, where the unique value for each color is determined using calibrated instruments and lighting conditions. Examples of device-independent color spaces are CIEXYZ, CIELAB, CIE Yxy, and CIE LCH, known in the art. Device-independent data is sometimes referred to herein as "device-independent coordinates." Device-independent data in the CIEXYZ color space is referred to herein as "XYZ data," or just "XYZ." Device-independent in the CIELAB color space is referred to herein as "LAB data," "CIELAB" or just "LAB."

Figure 1:
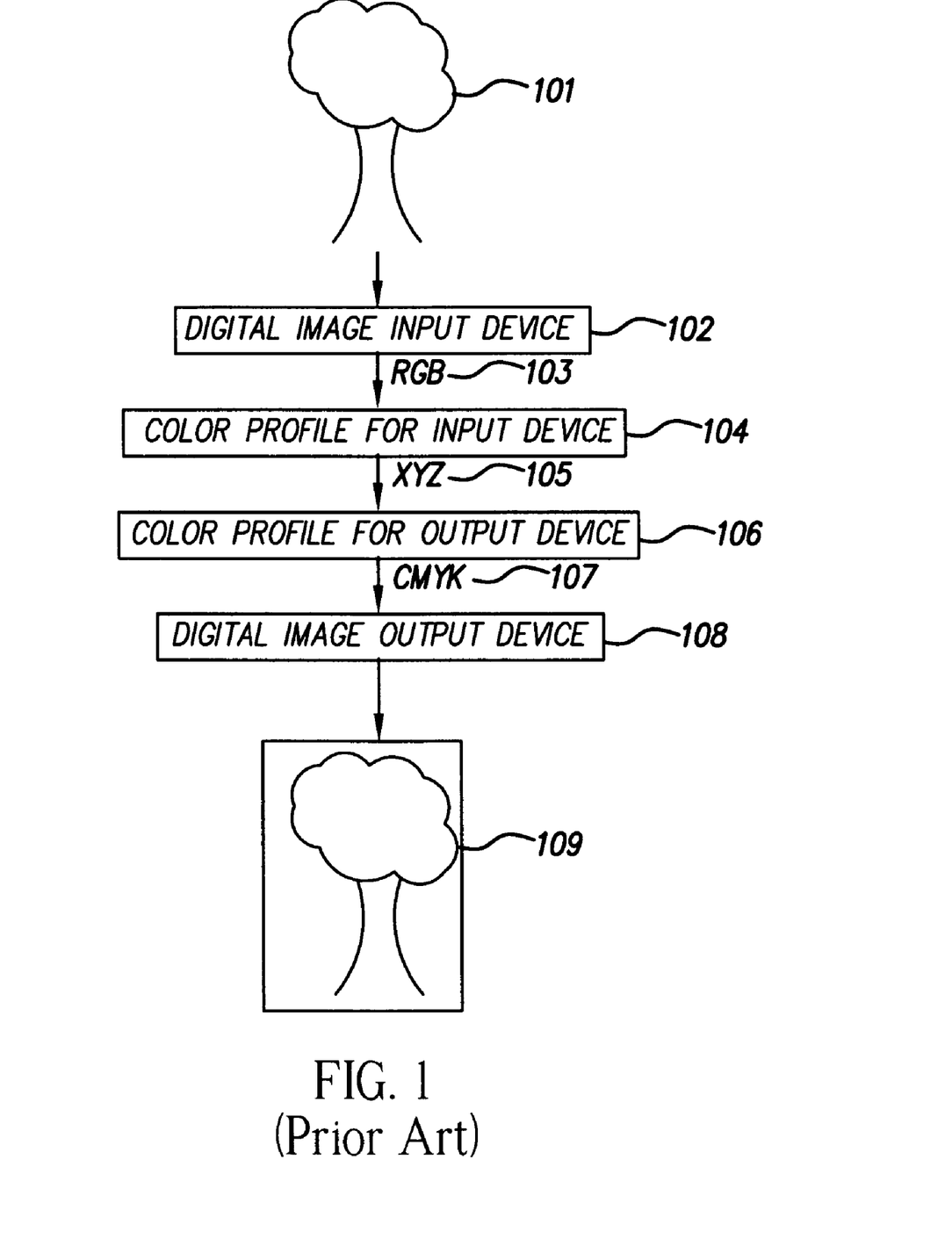
FIG. 1 illustrates a conventional arrangement for acquiring and outputting an image.

Theoretically, color profiles allow a user to acquire an image of an object using any digital-image input device and to output an accurate representation of the object from a digital-image output device. With reference to FIG. 1, for example, an image of an object 101 is acquired using a digital-image input device 102. The image is represented in FIG. 1 as RGB 103. Then, the image RGB 103 is converted into device-independent data (XYZ 105, for example) using the digital-image input device's color profile 104. The device-independent data XYZ 105 is then converted using the output device's color profile 106 into device-dependent data (CMYK 107, for example) specific to the output device 108. The output device 108 uses its device-dependent data CMYK 107 to generate an accurate representation 109 of the object 101.

Conventionally, a color profile is generated by acquiring a test image of a color chart located in front of scenery under a standard lighting condition. For example, a digital camera may be used to acquire a test image of a color chart with a basket of fruit in the background. A color chart generally is a physical chart that includes different color patches, each patch associated with a device-independent color value, such as a color value identifying a CIELAB color, when viewed under a standard lighting condition, such as D50, known in the art.

By comparing the device-dependent data acquired from the test image with the device-independent data known to be associated with the color chart, a color profile for the digital-image input device may be generated. However, many conventional schemes have difficulty or fail altogether when the color chart is illuminated differently than the scenery in the test image, or when the color chart, the scene, or both are over-exposed. Further, several of the better conventional schemes for generating a color profile need to operate on uncorrected raw 16-bit RGB device-dependent data to be successful, because more standard 8-bit image formats, such as TIFF or JPG, tend to exhibit clipping. Accordingly, a need in the art exists for quality color profiling capable of operating on (a) over-exposed or under-exposed color charts relative to scenery and (b) standard 8-bit formatted device-dependent data.

SUMMARY OF THE INVENTION

The above-described problems are addressed and a technical solution is achieved in the art by a system and a method for profiling a digital-image input device according to the present invention. In an embodiment of the present invention, profiling of the digital-image input device is performed based at least on an image of a color chart and an estimated illumination of the color chart generated by comparing illumination of device-dependent coordinate values for the image of the color chart with illumination of device-independent coordinate values of the color chart. Because the estimated illumination of the color chart is performed on data pertaining to the color chart, the present invention may generate a profile without reference to data pertaining to scenery in the image outside of the color chart. Consequently, the present invention may generate a profile irrespective of the relative exposure of the color chart with respect to other scenery in the image. Further, the image of the color chart may be in a standard 8-bit image format, as the system and the method disclosed herein operate well on data that is clipped.

According to an embodiment of the present invention, the device-independent coordinate values of the color chart are linearly scaled based upon a scaling factor associated with the comparison of the illumination of the device-dependent coordinate values and the illumination of the device-independent coordinate values. Optimized parameters describing tone curves and chromaticities of the profile may be calculated to enhance the generated profile based at least on the linearly scaled device-independent coordinate values. Further, selective adjustments to the device-independent coordinate values may be performed to enhance the generated profile.

BRIEF DESCRIPTION OF THE DRAWINGS

The present invention will be more readily understood from the detailed description of preferred embodiments presented below considered in conjunction with the attached drawings, of which.

It is to be understood that the attached drawings are for purposes of illustrating the concepts of the invention and may not be to scale.

DETAILED DESCRIPTION OF THE INVENTION

The present invention alleviates problems associated with under-exposure or over-exposure of a color chart relative to scenery in a test image used to generate a color profile for a digital-image input device. In particular, the present invention generates the color profile based upon device-dependent and device-independent data both associated with the color chart. Stated differently, the present invention may generate the color profile without regard to the scenery in the test image (i.e., the device-dependent data acquired from the scenery). Accordingly, the present invention is not necessarily dependent upon a relative exposure of the color chart with respect to the scenery. Of course, the present invention may incorporate the use of image data associated with the scenery, however such use is not necessary. Therefore, although the present invention is often described in the context of being dependent upon image data associated with the color chart, one skilled in the art will appreciate that the present invention does not exclude the additional use of image data associated with the scenery in the test image. Further, the present invention has been determined to operate well on image data that is clipped, and, accordingly, standard 8-bit format image data may be used.

Figure 2:
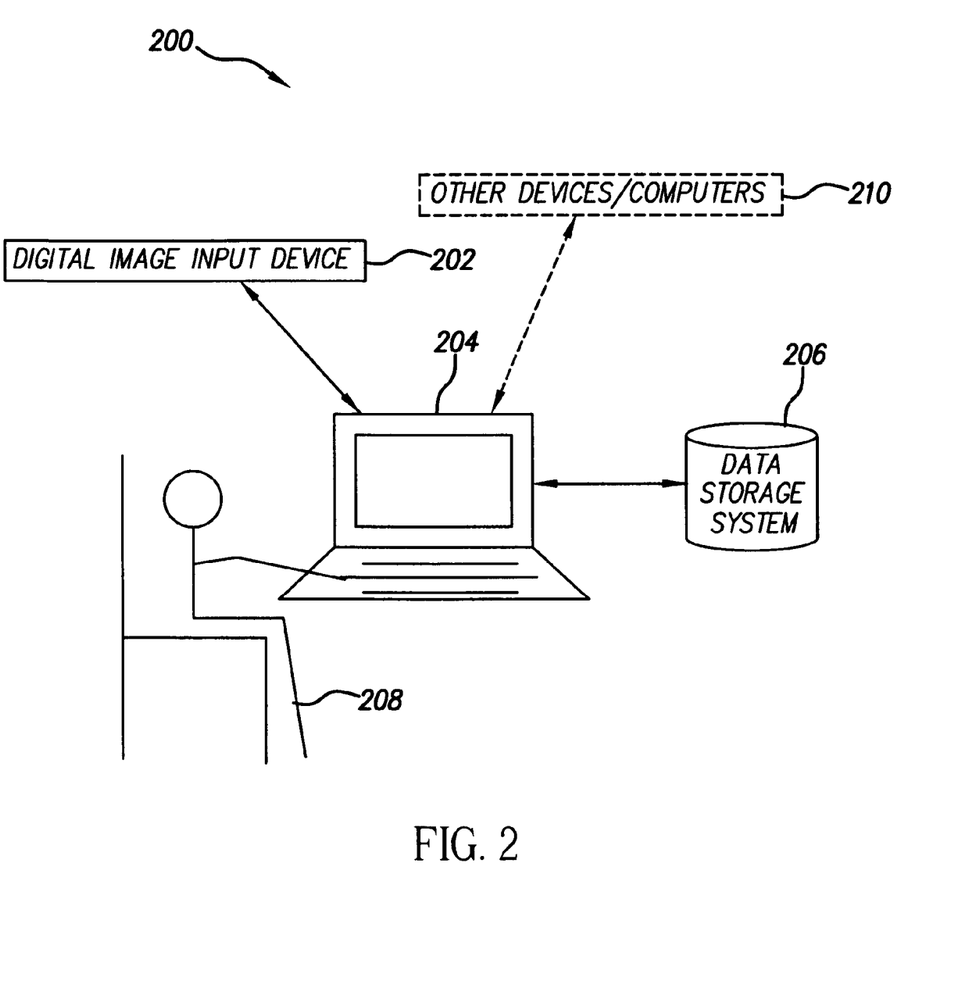
FIG. 2 illustrates a system for generating a color profile for a digital-image input device, according to an embodiment of the present invention.

FIG. 2 illustrates a system 200 for generating a color profile for a digital-image input device, according to an embodiment of the present invention. The system 200 may include a digital-image input device 202 communicatively connected to a computer system 204, which is communicatively connected to a data storage system 206. The computer system 204 may include one or more computers communicatively connected and may or may not require the assistance of an operator 208. The digital-image input device 202 acquires a test image of a color chart and optionally a scene outside of the color chart. Examples of the digital-image input device 202 include a digital camera or a scanner. The digital-image input device 202 transmits the test image to the computer system 204, which generates a color profile for the digital-image input device 202 based upon the test image and an estimated illumination of the color chart as discussed in more detail with reference to FIGS. 3 and 4. The color profile may be stored in the data storage system 206, output to other optional devices 210, or otherwise output from the computer system 204. It should be noted that the information needed by the computer system 204, such as the test image and information pertaining to the color chart, may be provided to the computer system 204 by any means, and not necessarily by the digital-image input device 202.

The data storage system 206 may include one or more computer-accessible memories. The data storage system 206 may be a distributed data-storage system including multiple computer-accessible memories communicatively connected via a plurality of computers, devices, or both. On the other hand, the data storage system 206 need not be a distributed data-storage system and, consequently, may include one or more computer-accessible memories located within a single computer or device.

The term "computer" is intended to include any data processing device, such as a desktop computer, a laptop computer, a mainframe computer, a personal digital assistant, a Blackberry, and/or any other device for processing data, and/or managing data, and/or handling data, whether implemented with electrical and/or magnetic and/or optical and/or biological components, and/or otherwise.

The phrase "computer-accessible memory" is intended to include any computer-accessible data storage device, whether volatile or nonvolatile, electronic, and/or magnetic, and/or optical, and/or otherwise, including but not limited to, floppy disks, hard disks, Compact Discs, DVDs, flash memories, ROMs, and RAMs.

The phrase "communicatively connected" is intended to include any type of connection, whether wired, wireless, or both, between devices, and/or computers, and/or programs in which data may be communicated. Further, the phrase "communicatively connected" is intended to include a connection between devices and/or programs within a single computer, a connection between devices and/or programs located in different computers, and a connection between devices not located in computers at all. In this regard, although the data storage system 206 is shown separately from the computer system 204, one skilled in the art will appreciate that the data storage system 206 may be stored completely or partially within the computer system 204.

Figure 3:
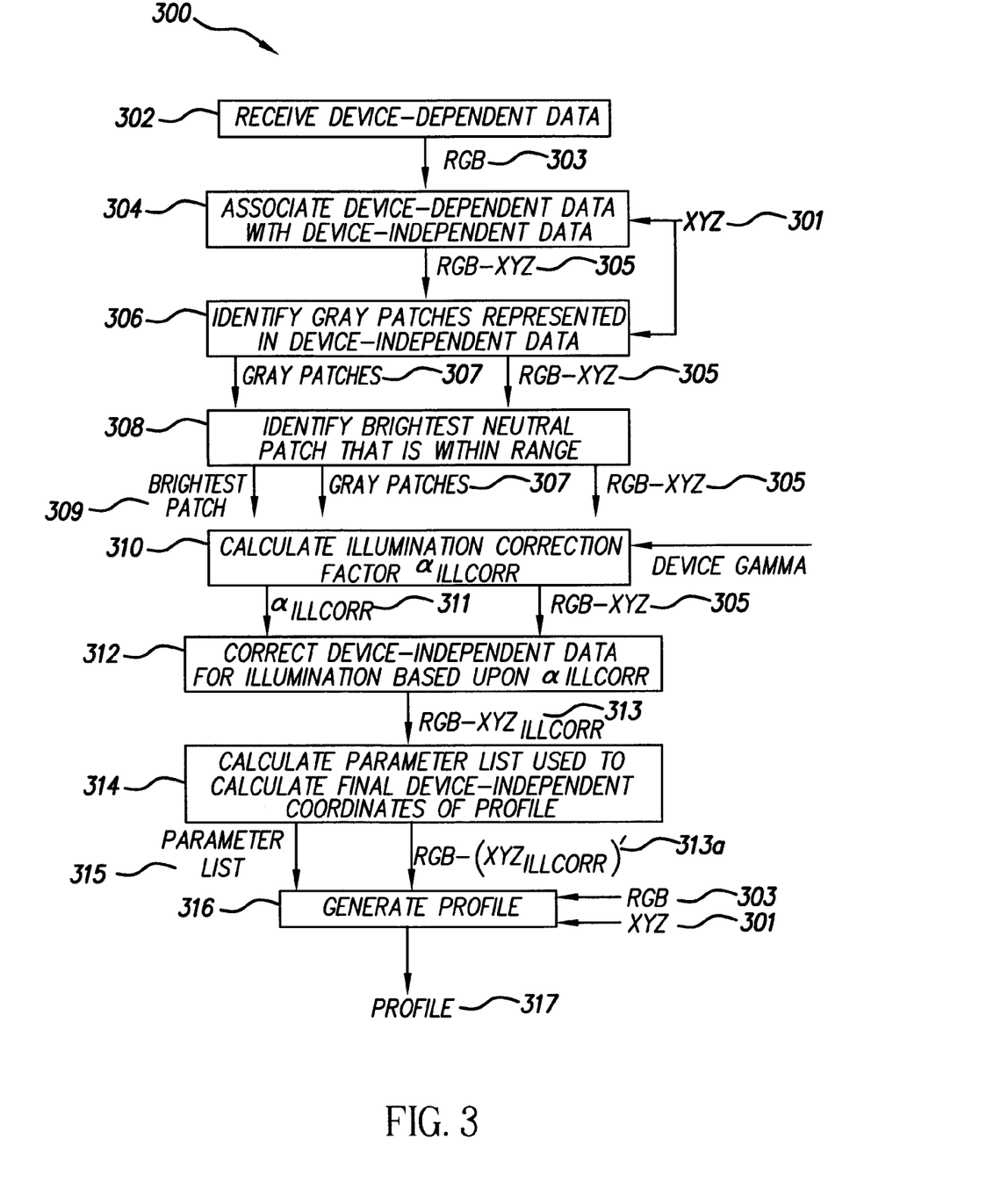
FIG. 3 illustrates a method for generating a color profile for a digital-image input device, according to an embodiment of the present invention.

FIG. 3 illustrates a method 300 for generating a color profile for the digital-image input device 202, according to an embodiment of the present invention. The method 300 is executed as hardware, software, and/or firmware by the computer system 204, according to an embodiment of the present invention.

At step 302, the computer system 204 receives device-dependent data from the digital-image input device 202 or from some other source. The device-dependent data received at step 302 is RGB data, according to an embodiment of the present invention. The device-dependent data represents a test image of at least a color chart. It should be noted that although this application is described in the context of using a color chart, any object that has known device-independent values associated with its colors may be used. It should also be noted that the device-dependent data received at step 302 need not include data pertaining to a scene outside of the color chart in the test image.

The operator 208, who also may operate the digital-image input device 202, may specify the location and orientation of the color chart in the test image. Alternatively, the orientation of the color chart may be determined automatically by the computer system 204. The average of the device-dependent RGB values received at step 302, for each color patch in the color chart may be determined, such that a single device-dependent RGB value for each color patch is output from step 302. Collectively, the device-dependent RGB values, each associated with a color patch, are referred to as an array of device-dependent RGB values represented as RGB 303.

At step 304, the array of RGB values, RGB 303, is associated with device-independent data XYZ 301 previously measured for the color chart used for the test image. The association of the device dependent data RGB 303 with the corresponding device-independent data XYZ 301 may be stored as a two-dimensional array, represented as "RGB-XYZ" 305 in FIG. 3. The array may include two columns, one for the device-dependent data and one for the device-independent data, where each row contains associated data for a single color patch in the color chart. For example, the following software code could be used to define such an array:

```
RGB rgbChartValue[i]
Lab labMeasuredValue[i], where 0<i<numPatches
``` rgbChartValue represents RGB 303 in FIG. 3. labMeasuredValue represents the previously measured device-independent data XYZ 301 associated with the color chart, converted and stored as Lab data. numPatches represents the number of patches in the color chart. One skilled in the art will appreciate that any manner of representing the association of the device-dependent data RGB 303 and the device-independent data XYZ 301 may be used.

Figure 4:
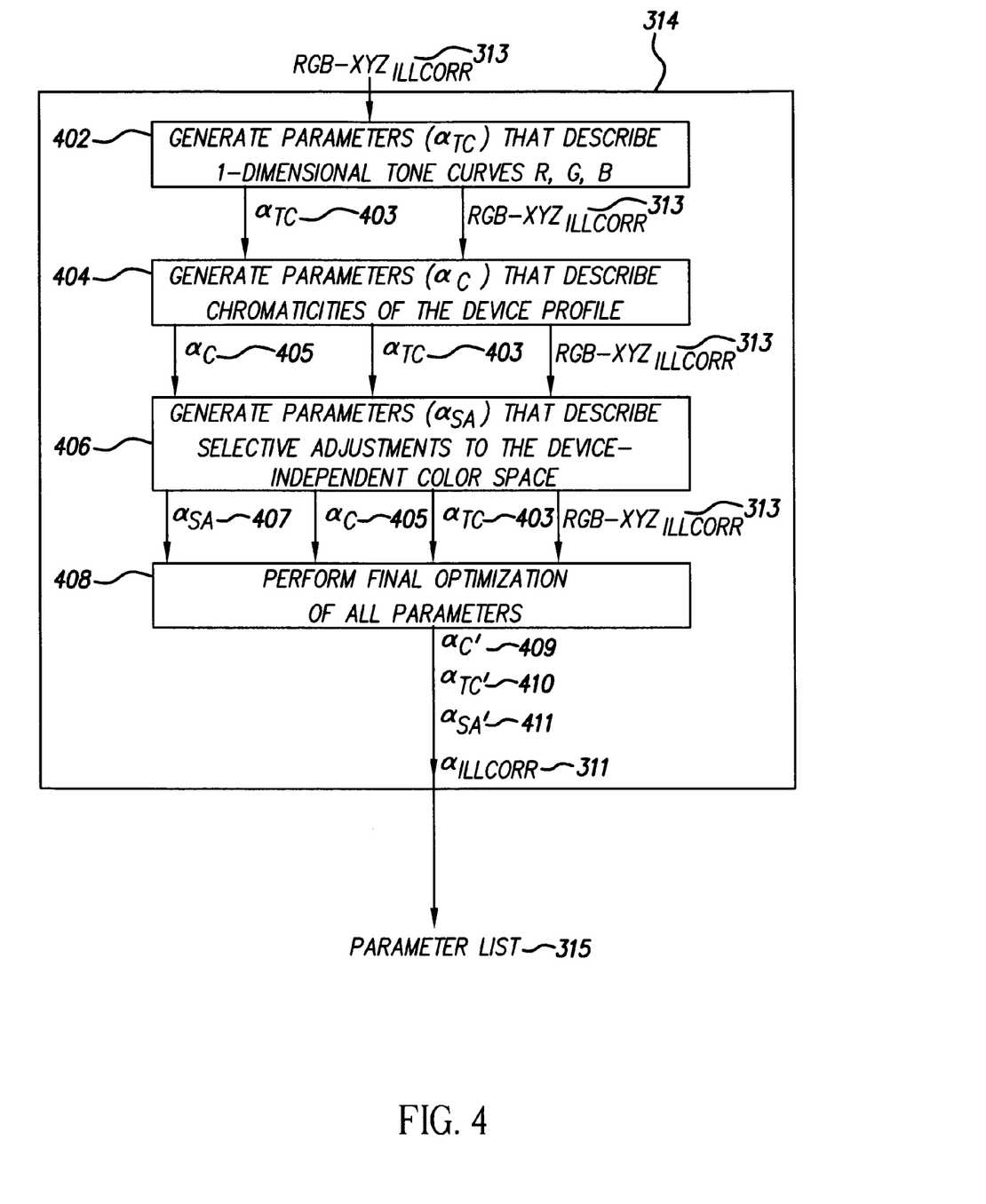
FIG. 4 illustrates a method for calculating a parameter list used to calculate final device independent coordinates of the profile, which may be used as step 314 in FIG. 3, according to an embodiment of the present invention.
Figure 5:
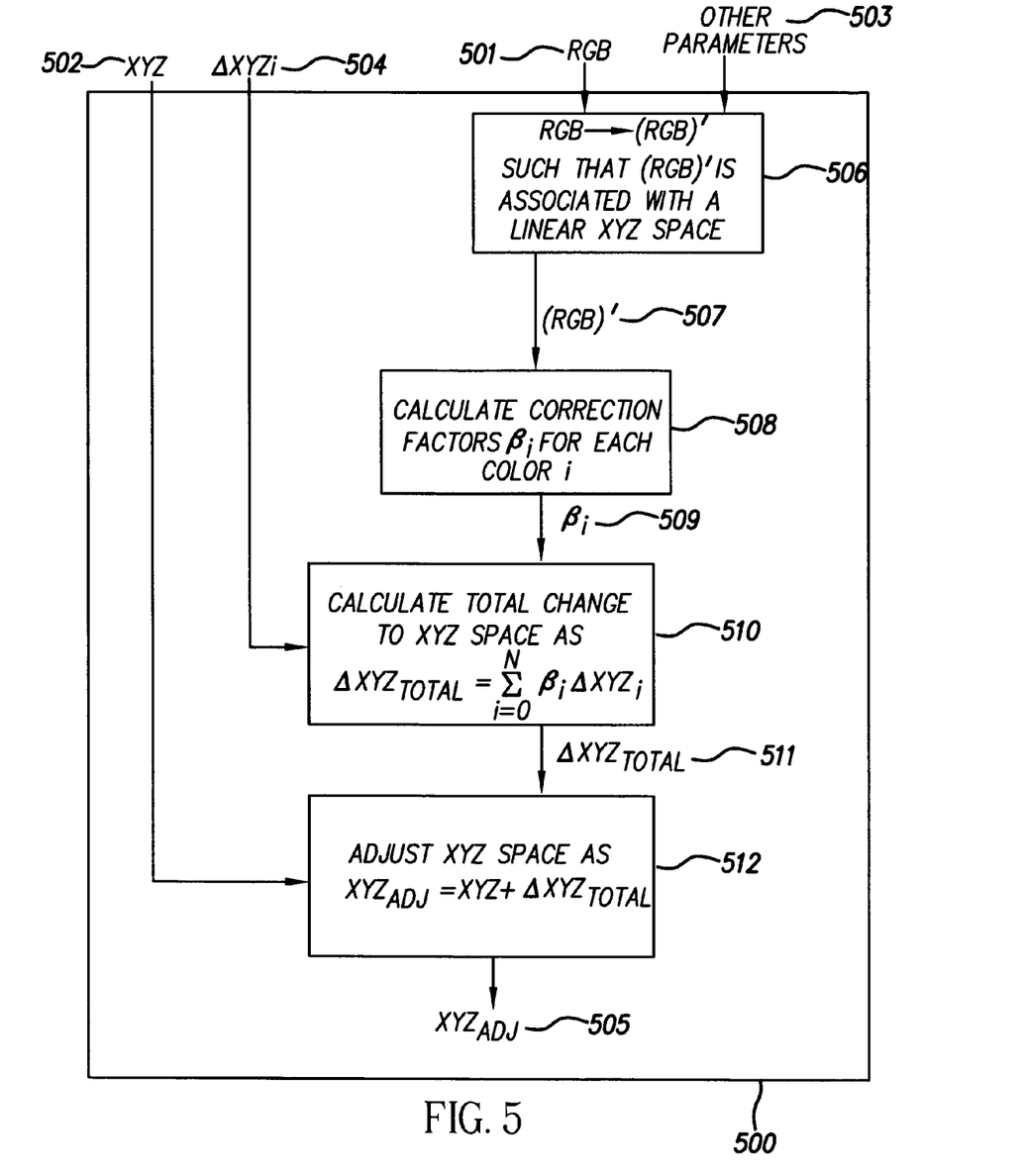
FIG. 5 illustrates a method for performing selective adjustments to the device independent color space, which may be used independently or as step 406 in FIG. 4, according to an embodiment of the present invention.

Although the device-independent data XYZ 301 is illustrated as being in the CIEXYZ device-independent color space, any device-independent color space may be used. Further, although FIGS. 3, 4, and 5 illustrate device-independent data as XYZ data, particular steps in FIGS. 3, 4, and 5 may operate on the device-independent data in other color spaces. Accordingly, conversions of XYZ data into other color spaces are implied by these steps and are not illustrated in the figures, because such conversions are well known to one of ordinary skill in the art.

At step 306, the gray patches in the device-independent data XYZ 301 are identified. The gray patches may be identified using the device-independent data XYZ stored in the array RGB-XYZ 305. The identified gray patches output at step 306 are represented as GrayPatches 307. RGB-XYZ 305 may pass through step 306 to step 308 unmodified. Although not required, it may be advantageous to identify gray patches in the LAB color space as opposed to the XYZ color space. In particular, in the LAB color space, gray colors are associated with the coordinates "a" and "b" approximately equal to zero, thereby providing for a simple calculation. Accordingly, the device-independent data XYZ in the array RGB-XYZ 305 may be converted to LAB prior to performing step 306. The following software code illustrates a way of identifying the GrayPatches 307, as well as the benefits of operating in the LAB color space.

```
grayIndex=0;
For (i=0; i<numPatches; i++)
{
    If (labMeasuredValue[i].a( )<GrayRange &&
       labMeasuredValue[i].b( )<GrayRange)
    {
        LabGrayValue.lab[grayIndex]=
           labMeasuredValue[i];
        rgbGrayValues[grayIndex] = rgbChartValues[i];
        grayIndex++;
    }
}
numGrayPatches=grayIndex;
``` labMeasuredValue[i].a( ) is the "a" value (in LAB) of the current patch i. Similarly, labMeasuredValue[i].b( ) is the "b" value (in LAB) of the current patch i. GrayRange is the value used to determine if a color is gray. According to an embodiment of the present invention, GrayRange is 5 delta E. LabGrayValue.lab[ ], when output, contains the array of gray patches 307 in the CIELAB device-independent color space.

rgbGrayValues[ ] represents the device dependent gray values extracted from the RGB image of the color chart. numGrayPatches is the total number of identified gray patches.

According to an embodiment of the present invention, GrayPatches 307 includes both the device-independent measured data array (referred to as LabGrayValue[ ] in the software code, above) as well as the corresponding device dependent gray values extracted from the RGB image of the chart (referred to as rgbGrayValues[ ] in the software code, above). It may be convenient to sort the array of LabGrayValue[i] and rgbGrayValues[i] where index i=0, . . . , numGrayPatches maps to lightest->darkest, unless it is known in advance that the chart data is already sorted in this manner.

At step 308, the brightest within-range gray patch in GrayPatches 307 is identified and output as Brightest Patch 309. According to an embodiment of the present invention, the brightest within-range gray patch is the gray patch (in device-independent coordinates) that has associated device-dependent data of R<255, G<255, and B<255. Stated differently, the brightest gray patch having associated non-overexposed device-dependent data is identified. The device-independent data and the device-dependent data necessary for performing step 308 may be obtained from the array RGB-XYZ 305. GrayPatches 307 and RGB-XYZ 305 may be passed through step 308 unchanged to step 310. The following software code illustrates a way to accomplish step 308, which assumes that the input GrayPatches 307, as well as the array RGB-XYZ 305, have been sorted in order of intensity (coordinate "L" in LAB) (from brightest to darkest):

```
int maxGrayPatchIndex = 0;
float maxL=0.0;
For (i=0;i<numGrayPatches;i++)
{
if (LabGrayValue.lab[i]>maxL && rgbGrayValues[i].r( ) < 255&&
    rgbGrayValues [i].g( ) < 255&& rgbGrayValues [i].b( )
    < 255)
    {
       maxL=LabgrayValue[i];
       maxGrayPatchIndex =i;
    }
}
``` maxGrayPatchIndex, upon completion of the above-code, is the location in the array labGrayValue.lab[ ] (GrayPatches 307) that stores the brightest in-range gray patch. maxL, upon completion of the above-code, is the L* value of the brightest in-range gray patch from labGrayValue.lab[ ] (GrayPatches 307). maxL is subsequently converted to $Y_{measured}$, discussed below. rbgChartValues[ ] represents the device-dependent data from the array RGB-XYZ 305, such that rgbChartValues [i].r( ) is the red component, rgbChartValues[i].g( ) is the green component, and rgbChartValues[i].b( ) is the blue component.

At steps 310 and 312, in order to compensate for the effects of over-illumination or under-illumination of the color chart, the device-independent data of the color chart (stored in the array RGB-XYZ 305) is scaled by an illumination-correction factor $\alpha_{ILLCORR}$. $\alpha_{ILLCORR}$, according to an embodiment of the present invention, is generated by comparing the illumination of the BrightestPatch 309 in device-independent coordinates and the illumination of the same patch as indicated by the associated device-dependent coordinates. In other words, the measured illumination of the BrightestPatch 309 is compared against the illumination of the same patch as recorded by the digital-image input device in the RGB data 303. According to an embodiment of the present invention, $\alpha_{ILLCORR}$ is generated as follows.

$$\alpha_{ILLCORR} = (Y_{estimated})/(Y_{measured})$$

$Y_{estimated}$ is an estimated illumination of the RGB data 303 for the brightest in-range gray patch. $Y_{estimated}$ may be represented as follows.

$$Y_{estimated} = f_y(R_{i_0}, G_{i_0}, B_{i_0})$$

where the index "$i_0$" refers to maxGrayPatchIndex. $Y_{measured}$ is the illumination of the XYZ data 301 as identified by BrightestPatch 309.

At step 312, according to an embodiment of the present invention, illumination-corrected device-independent data is generated by linearly scaling the device-independent data XYZ 301 by $\alpha_{ILLCORR}$. Such illumination-corrected device-independent data is represented in FIG. 3 as $XYZ_{ILLCORR}$. The one-to-one color-patch association between $XYZ_{ILLCORR}$ and the RGB data 303 is represented as RGB-$XYZ_{ILLCORR}$ 313. According to an embodiment of the present invention, $XYZ_{ILLCORR}$ is generated by multiplying all values of the XYZ data 301 by $\alpha_{ILLCORR}$, as illustrated below.

$$\begin{pmatrix} X \\ Y \\ Z \end{pmatrix}_{ILLCORR} = \alpha_{ILLCORR} \begin{pmatrix} X \\ Y \\ Z \end{pmatrix}$$

The vector on the right represents the XYZ data 301 and the vector on the left represents $XYZ_{ILLCORR}$. This correction assures that the brightest in-range gray patch continues to have a value that corresponds to the original RGB value for that patch assuming an initial camera gamma of 2.2. According to this embodiment of the present invention, it is assumed that values of gamma and RGB chromaticites have been initialized to the default digital-image input device profile settings, e.g., sRGB or Adobe RGB, known in the art.

At step 314, an optimized list of parameters 315 used to generate final device independent coordinates of the digital-image input device profile is calculated. FIG. 4, discussed below, illustrates an inventive method for generating such parameters, according to an embodiment of the present invention. However, any method for calculating these parameters, known in the art, may be used. The parameter list 315 is used at step 316, as well as RGB 303 and XYZ 301, to generate a profile 317 for the digital-image input device 202.

FIG. 4 illustrates an exploded view of the substeps that may be performed at step 314, according to an embodiment of the present invention. The input to step 402 is the RGB-$XYZ_{ILLCORR}$ array 313 of associated device-dependent data RGB and illumination-corrected device-independent data $XYZ_{ILLCORR}$. At step 402, optimal parameters $\alpha_{TC}$ 403 that describe the 1-dimensional tone curves R, G, and B of the device-dependent data RGB (in RGB-$XYZ_{ILLCORR}$) are generated. RGB-$XYZ_{ILLCORR}$ 313 is passed unmodified through step 402 to step 404.

The process of generating optimized $\alpha_{TC}$ 403 may be performed by selecting initial parameters for $\alpha_{TC}$, according to an embodiment of the present invention, and applying the initially selected parameters for $\alpha_{TC}$ to the device-dependent data RGB to generate predicted device-independent coordinate values. Then, an error between the generated predicted device-independent coordinate values and the measured device-independent coordinate values ($XYZ_{ILLCORR}$) is calculated. The process is repeated with newly selected parameters for $\alpha_{TC}$ until the calculated error is minimized. The parameters for $\alpha_{TC}$ 403 that produce the minimum error are output at step 402 as the optimal parameters $\alpha_{TC}$ 403. The process of step 402, according to an embodiment of the present invention, may be represented as follows.

$$Err(\alpha_{TC}) = \sum_{i=i_0}^{i=n-1} \left\| \begin{pmatrix} L^*_{ILLCORR} \\ a^*_{ILLCORR} \\ b^*_{ILLCORR} \end{pmatrix}_i - \begin{pmatrix} F_{L^*}(RGB_i, \alpha_{TC}) \\ F_{a^*}(RGB_i, \alpha_{TC}) \\ F_{b^*}(RGB_i, \alpha_{TC}) \end{pmatrix} \right\|^2$$

The index "i" refers to the "n" gray patches on the color chart, where the index "$i_0$" refers to maxGrayPatchIndex, which is the location in the array labGrayValue.lab[ ] (GrayPatches 307) that stores the brightest in-range gray patch. The $(L^*a^*b^*_{ILLCORR})$ vector represents the LAB coordinate values corresponding to $XYZ_{ILLCORR}$. The $(F_{LAB}(RGB_i, \alpha_{TC}))$ vector represents the function used to calculate the predicted device-independent coordinates corresponding to the device-dependent data RGB 303. Any function, known in the art, may be used for $F_{LAB}(RGB_i, \alpha_{TC})$. Using well-known methods, such as Newton's method or Powell's method, the parameters $\alpha_{TC}$ may be varied automatically in such a manner as to minimize the value of the least squared error function Err($\alpha_{TC}$). The resulting values of $\alpha_{TC}$ may, in some cases, be optimal values for use in predicting device independent coordinates from RGB 303.

According to an embodiment of the present invention, the following expression may be used as $F_{LAB}(R_i, \alpha_{TC})$ for the red tone channel.

$f_R(R, R_{Max}, R_{bias}, \gamma_R, \beta_C) = R_{Max}(1.0 - R_{bias})$
$[f_c(R, \beta_C)]^{\gamma_R} + R_{bias}$ $f_R$ is a function that defines the one-dimensional response of the red tone channel, such that $R_{Max}$, $R_{bias}$, $\gamma_R$, and $\beta_c$ represent $\alpha_{TC}$ in the case where the digital-image input device is a digital camera. The above expression may be used similarly for the green and blue tone channels, where $\beta_c = 0$ in the contrast function $f_c(R)$ defined by:

$f_R(x, \beta_C) = x + \beta_C(0.5 + 0.5(2(x-0.5))^3 - x)$.

Note that for $\beta_c = 0$, the contrast function $f_c(x) = x$. $R_{Max}$ is a linear scaling factor and indicates the maximum red color recorded by the digital-image input device. $R_{bias}$, a black bias offset, indicates the darkest red color recorded by the digital-image input device 202. $\gamma_R$ is the gamma, known in the art, of the digital-image input device associated with the red color. Alternatively, $\gamma_R$ may equal $\gamma_G$ and $\gamma_B$, which all may equal the overall gamma of the device 202. $\beta_c$ is a parameter for adjusting contrast, i.e., a means for reducing the output of the function $f_c()$ for values $0.0 < x < 0.5$ and increasing the output of function $f_c()$ for $0.5 < x < 1.0$. Many mathematical functions exist that can perform such an adjustment, e.g., $3^{rd}$ order polynomials, splines, etc. The concept of performing such an adjustment is well-known in the art (c.f. the "auto-contrast" feature in applications such as Adobe® PhotoShop®) although it is often in the context of an aesthetic improvement to an image rather than attempting to characterize a device with regard to color data.

The following software code illustrates how step 402 may be performed, according to an embodiment of the present invention. It is assumed in this software code that all Gray-Patches represented in RGB-$XYZ_{ILLCORR}$ 313 are sorted in order of brightest to darkest.

```
MinimizeError(sumSquareGrayDeltaE, parameterList,
    NumParameters)
where
    sumSquareGrayDeltaE( )
is defined as:
    for (i=brightestValidGray; i<nGray; i++)
    {
        xyzPred=evaluateModel(grayRGB[i]);
        labPred=mColMetric->XYZToLab(xyzPred);
        labMeas=grayLab[i];
        xyzMeas=mColMetric->LabToXYZ(labMeas);
        xyzMeas*=Y_IlluminationCorr;
        labMeas=mColMetric->XYZtoLab(xyzMeas);
        errSq=distanceSquaredLab(labPred, labMeas);
        sumSq+=errSq;
    }
    return(sumSq);
``` parameterList represents $\alpha_{TC}$ 403 output by step 402, and NumParameters represents the number of parameters in $\alpha_{TC}$ 403. brightestValidGray represents the location of the brightest in-range gray patch in $XYZ_{ILLCORR}$. nGray represents the total number of gray patches. xyzPred is a predicted device independent value corresponding to a device-dependent value in RGB 303. evaluateModel( ) is a function that generates the predicted device independent value xyzPred, and is akin to $F_{LAB}(RGB_i, \alpha_{TC})$, discussed above. labPred represents the LAB version of xyzPred, such that xyzPred is converted to LAB space using the function mColMetric->XYZ-ToLab( ). labMeas represents the LAB device-independent values of the current gray patch (grayLab[ ]). xyzMeas represents the XYZ version of labMeas. xyzMeas* represents xyzMeas corrected by Y_IlluminationCorr, which represents $\alpha_{ILLCORR}$. errSq is an individual squared error and sumSq is the total squared error.

The values of $\alpha_{TC}$ 403 should be adjusted to minimize the sum of the calculated squared errors (sumSq, for example). The mathematical model (evaluateModel( ), for example) used to predict the device-independent coordinates associated with RGB (in RGB-$XYZ_{ILLCORR}$) may be any model known in the art. However, it is important that a selected model provide smoothness (i.e., low values of second order derivatives and/or no unwanted visual banding or artifacts when the profile is used for characterizing images) and as few parameters as possible, while achieving accurate predictions. The following software code illustrates a mathematical model (evalGammaModel( ) used as $F_{LAB}(RGB_i, \alpha_{TC})$, discussed above) that predicts device-independent coordinates for the device dependent data RGB, according to an embodiment of the present invention.

```
double evalGammaModel (double *RGBMax, double *gamma,
    double *blackBias, double filmContrastCorr, int rgbIndex,
    const double& cVal)
{
    double val, corrVal, result=0.0;
    corrVal=0.5+0.5*pow(2.0*(cVal-0.5),3.0)-cVal;
    val=cVal+filmConstrastCorr*corrVal;
    if(rgbIndex != iFixedMaxRGB)
        result=RGBMax[rgbIndex]*(1.0-
            blackBias[rgbIndex])*
            pow(val, gamma[rgbIndex]) +
            blackBias[rgbIndex];
    else
        result=(1.0-blackBias[rgbIndex])*
            pow(val, gamma[rgbIndex]) +
            blackBias[rgbIndex];
```

-continued

```
        if (cVal<0.0)
            result=0.0;
            return(result);
    }
```

In this example, $\alpha_{TC}$ 403 includes RGBMax, gamma, blackBias, and filmContrastCorr. RGBMax corresponds to the linear scaling factor RMax, described above, as well as the $G_{MAX}$ and $B_{MAX}$ counterparts. Gamma corresponds to $\gamma_R$, described above, as well as the $\gamma_G$ and $\gamma_B$ counterparts. blackBias corresponds to $R_{bias}$, described above, as well as the $G_{bias}$ and $B_{bias}$ counterparts. filmContrastCorr corresponds to $\beta_c$. Note that rgbIndex indicates which channel is being calculated (rgbIndex=0,1,2=>R,G,B) and cVal is the input color value (R,G, or B) which is being converted to the corresponding output color value modified by the evalGammaModel( ) function. The value "result" is calculated to obtain R,G,B (out) for input index rgbIndex=0,1,2. The resultingRGB vector is multiplied by the RGB->XYZ matrix described below to obtain the calculated values of XYZ. The above calculation of the sum square error is repeated after methodically adjusting parameters $\alpha_{TC}$ 403 in the RGB->XYZ calculation until the sum square error is minimized.

Note that the above tone curve calculation begins with a contrast adjustment applied to the RGB input values. This contrast adjustment is a $3^{rd}$ order polynomial with constraints that no correction is applied to values RGB=0, 0.50, or 1.0 (assume RGB normalized to 1.0). The correction is multiplied by filmContrastCorr, default=0.0, which can be positive or negative (decreasing or increasing contrast, respectively) and added to the RGB value. The modified values are used to calculate a standard gamma function with a black bias offset (defined by blackBias[ ]), a linear scaling factor for each R, G, B channel (RGBMax[ ]) and a value of Gamma for each RGB channel (gamma[ ]). In this example, the total number of adjustable parameters $\alpha_{TC}$ 403 is ten: RGBMax, gamma for R, G, and B, blackBias for R, G, and B, and a single value of filmContrastCorr for all three channels. Note that if the number of data values for the color chart is 6 gray patches, there are 18 data points to calculate on (6 times 3 (for L*,a*,b*) =18). In the event that the first two patches are overexposed, the number of data points is reduced to 4×3=12. One can optionally assume that gamma is identical for each of the three RGB channels and reduce the number of parameters $\alpha_{TC}$ 403 to 8. This approach is helpful for lower quality images that have noisy RGB data extracted from the color chart.

Having determined optimal parameters $\alpha_{TC}$ 403 at step 402, step 404 generates optimal parameters ac 405 that describe the RGB chromaticites of the device profile. $\alpha_{TC}$ 403 and RGB-$XYZ_{ILLCORR}$ 313 are passed unmodified through step 404 to step 406. In step 404, standard Matrix/TRC formalism, as indicated in the description below, may be used to calculate the values of XYZ for R, G, and B for all the color chart values using tone response calculated in step 402. The error function is similar to that described above with respect to step 402. However, all data points may be used, and all squared errors added to the sum may be reduced by a predefined weighting factor if values of R, G, or B are equal to 0 or 255, implying that the image data was clipped and that the actual R, G, or B value is not known accurately.

In step 404, the adjusted parameter list $\alpha_C$ 405 is the chromaticity value (xy, known in the art) for R, G, and B. According to an embodiment of the present invention, the mathematical description of the matrix portion of the XYZ function of RGB is as follows. Note that it is assumed that device-dependent data RGB (in RGB-$XYZ_{ILLCORR}$ 313) has already been processed by the RGB tone curve functions defined above with respect to step 402. In other words, the new values of RGB are in linear RGB space. Thus, they can easily be converted to XYZ using a simple matrix:

$$\begin{pmatrix} X \\ Y \\ Z \end{pmatrix} = M \begin{pmatrix} R \\ G \\ B \end{pmatrix}$$

$$M = \begin{pmatrix} X_r & X_g & X_b \\ Y_r & Y_g & Y_b \\ Z_r & Z_g & Z_b \end{pmatrix}$$

The M matrix is uniquely determined by the (x,y) chromaticities of the RGB channels and the white point for the system, i.e., the (x,y) chromaticities resulting from the value of the XYZ at RGB=max.

$$M(x_{r_1}, y_{r_1}, x_{g_1}, y_{g_1}, x_{b_1}, y_{b_1}, x_{wp}, y_{wp}) = M_c(x_{r_1}, y_{r_1}, x_{g_1}, y_{g_1}, x_{b_1}, y_{b_i})$$

$$\begin{pmatrix} Y_{r_1}(x_{wp}, y_{wp}) & 0 & 0 \\ 0 & Y_{g_1}(x_{wp}, y_{wp}) & 0 \\ 0 & 0 & Y_{b_1}(x_{wp}, y_{wp}) \end{pmatrix}$$

$$M_c(x_{r_1}, y_{r_1}, z_{r_1}, x_{g_1}, y_{g_1}, z_{g_1}, x_{b_1}, y_{b_1}, z_{b_1}) =$$

$$\begin{pmatrix} x_{r_1}/y_{r_1} & x_{g_1}/y_{g} & x_b/y_{b_1} \\ y_{r_1}/y_{r_1} & y_{g_1}/y_{g_1} & y_{b_1}/y_{b_1} \\ z_{r_1}/y_{r_1} & z_{g_1}/y_{g_1} & z_{b_1}/y_{b_1} \end{pmatrix}$$

$$\begin{pmatrix} Y_{r_1}(x_{wp}, y_{wp}) \\ Y_{g_1}(x_{wp}, y_{wp}) \\ Y_{b_1}(x_{wp}, y_{wp}) \end{pmatrix} = M_c^{-1} \begin{pmatrix} x_{wp}/y_{wp} \\ 1 \\ (1 - x_{wp} - y_{wp})/y_{wp} \end{pmatrix}$$

In this case, the formalism for defining the error function is identical to process of defining the tone curve described above with respect to step 402, with the differences that a) all color chart values can be used (as opposed to only the gray chart patches) and b) the parameters ac defined are the values of x and y for the R, G, B channels. The white point of model ($x_{wp}$,$y_{wp}$) should correspond to the white point used for the measured data of the chart, typically D50, known in the art.

At step 406, which is optional, optimal parameters $\alpha_{SA}$ 407 that describe selective adjustments to the resulting device-independent color space values XYZ of the device profile. Parameters $\alpha_{SA}$ 407 may be optimized using the error minimization routines described above with respect to steps 402 and/or 404. According to an embodiment of the present invention, the selective adjustments performed by parameters $\alpha_{SA}$ 407 at step 406 are made to one or more colors such that there is substantially no risk of introducing artifacts or unwanted corruption to images converted or rendered with profiles that have been modified with this approach. Although any method may be used at step 406, an inventive process of performing selective adjustments to a device-independent color space as part of step 406 is described below with respect to FIG. 5. The embodiment illustrated with FIG. 5 may be used to generate parameters $\alpha_{SA}$ 407 that comprise a list of corrections $\Delta XYZ_i$ for i=0, . . . ,5 corresponding to R,G,B,C,M,Y. Such parameters may be optimized using the error minimization processes described above such that an adjusted device-independent color space $XYZ_{adj}$ 505 is generated that minimizes sum squared error.

At step 408, also an optional step, a final optimization of some or all of the parameters in $\alpha_{TC}$ 403, $\alpha_C$ 405, and $\alpha_{SA}$ 407 may be performed. These parameters may be optimized individually by repeating steps 402 and/or 404 and/or 406 and/or by optimizing most of the parameters as a group using the error minimization techniques mentioned above, such as Powell. For images that are not over-exposed, the total number of data points is 24×3=72. The total number of adjustable parameters is 10 for the tone curves ($\alpha_{TC}$ 403), 6 for the chromaticities ($\alpha_C$ 405), and 18 for the selective XYZ adjustments ($\alpha_{SA}$ 407). Since there is a strong correlation of the chromaticity values and the selective XYZ adjustments, it may be beneficial to perform a global optimization of the tone curve and selective chromaticities simultaneously, leaving the chromaticities fixed. The output of step 408 may include adjusted ac parameters $\alpha_C'$ 409, adjusted $\alpha_{TC}$ parameters $\alpha_{TC}'$ 410, and adjusted $\alpha_{SA}$ parameters $\alpha_{SA}'$ 411. $\alpha_C'$ 409, $\alpha_{TC}'$ 410 and $\alpha_{SA}'$ 411 are output from step 408 and included in ParameterList 315. RGB-$XYZ_{ILLCORR}$ 313 need not be output from step 408, and, instead, $\alpha_{ILLCORR}$ 311 may be output from step 408 and added to the ParameterList 315 used to generate the profile 317 at step 316. In this regard, it should be noted that step 312 could be performed as part of step 316. In this scenario, $\alpha_{ILLCORR}$ 311 and RGB-XYZ 305, output from step 310, would be passed directly as input to step 314, instead of RGB-$XYZ_{ILLCORR}$ 313. Anytime illumination-corrected device-independent data is needed to be operated on in step 314, $\alpha_{ILLCORR}$ 311 could be applied to XYZ 301 (stored in RGB-XYZ 305) to generate $XYZ_{ILLCORR}$.

The above method of FIGS. 3 and 4 has been shown to provide good results on image with color checker, known in the art, that are either over-exposed or less well-illuminated than the rest of a scene. In all cases, the extreme colors and overall white balance is improved. If desired, the measured chart values XYZ 301 can be modified to achieve the equivalent of a "look profile", i.e., images can be made more saturated or otherwise modified.

Turning now to FIG. 5, a method 500, according to an embodiment of the present invention, for performing selective adjustments to a device independent color space is illustrated. The method 500 ensures an excellent visual match between an image displayed for viewing and the same image printed out in hard-copy form. The method 500 is useful for characterizing image data coming from input devices, rendering images to display devices, and converting images to output devices. The method 500 also is useful for improving the accuracy of a color profile for a digital-image input device, such as a digital camera or a scanner. Accordingly, the method 500 may be used as part of step 406 in FIG. 4. However, one skilled in the art will appreciate that the method 500 may be used completely independently of the method 300 illustrated with FIGS. 3 and 4.

The method 500 applies corrections in a linear manner in all or selected areas of device-independent data derived from device-dependent data with substantially no possibility of introducing artifacts. Selective adjustments may be made to the device-independent data to improve color in selected color regions, such as in the vicinity of red ("R"), green ("G"), blue ("B"), cyan ("C"), magenta ("M"), or yellow ("Y"), without degrading color in the unmodified color areas.

Inputs used by the method 500 include device-dependent data "RGB" 501, device-independent data "XYZ" 502, other parameters 503, and changes to selected regions of color "$\Delta XYZ_i$" 504 in device-independent coordinates, where "i" represents a local region of color. When the method 500 is used as part of step 406 in FIG. 4, $\Delta XYZ_i$ 504 represents $\alpha_{SA}$ 407. The device-dependent data RGB 501 and the device-independent data XYZ 502 correspond, such that each piece of device-dependent data in RGB 501 corresponds to a piece of device-independent data in XYZ 502. For example, if the method 500 is used as step 406 in FIG. 4, the RGB data in RGB-$XYZ_{ILLCORR}$ 313 may be input as RGB data 501, and the associated device-independent data $XYZ_{ILLCORR}$ in RGB-$XYZ_{ILLCORR}$ 313 may be input as XYZ data 502.

When attempting to improve a profile for RGB device-dependent data, such as RGB data 501, it is desirable to perform a correction in a device-independent color space that is similar to the output of the mathematical expression characterizing the device associated with the RGB data. A common mathematical expression characterizing RGB-data-generating devices, such as digital cameras and scanners, is a modified version of the Matrix/TRC formalism described above, for example, in regard to step 402 in FIG. 4. This Matrix/TRC formalism inherently converts RGB to XYZ. Hence, for most devices, XYZ tristimulous space is the preferred space in which to perform corrections. Therefore, the device-independent data 502 is shown as XYZ data, and the output of the method 500 is adjusted XYZ coordinates, illustrated as $XYZ_{adj}$ 505. However, similar linear corrections to those described with reference to the method 500 may be performed with some degree of success for visually uniform color spaces, such as CIELAB, and the various CIECAM models such as CIECAM 98, known in the art.

$\Delta XYZ_i$ 504 represents changes (e.g., to saturation, hue, and brightness) to selected regions "i" of color in the device-independent color space. According to an embodiment of the present invention, $0 \leq i \leq 5$, such that the values zero to five are associated with the colors red, green, blue, cyan, magenta, and yellow, respectively (referred to as $R_0$, $G_0$, $B_0$, $C_0$, $M_0$, and $Y_0$, respectively). One skilled in the art will appreciate, however, that changes to different color regions may be used. The value $R_0$ is defined as R=$R_{max}$, G=0, B=0, C=0, M=0, and Y=0. The values of $G_0$, $B_0$, $C_0$, $M_0$, and $Y_0$ follow similarly. $\Delta XYZ_i$ 504 may be generated manually or automatically. An example of manually generating $\Delta XYZ_i$ 504 is having an operator view a displayed image (such as on a CRT) or a hard copy print out of an image generated from the device-independent data XYZ 502 and then make changes to select colors of the displayed or printed image. For instance, if red in a displayed image looks too bright, the operator may specify a negative brightness value for $\Delta XYZ_0$ 504 to reduce the brightness of the red in the image. Alternatively, $\Delta XYZ_i$ data 504 may be generated automatically through the use of an error minimization routine, such as that described with respect to steps 402 and/or 404 above. For example, if the method 500 is used as part of step 406 in FIG. 4, initial values for $\Delta XYZ_i$ data 504 may be automatically generated. Then, the method 500 may be performed iteratively, such that different values of $\Delta XYZ_i$ data 504 are used in an effort to minimize the sum squared error between the resulting device-independent color space XYZadj 505 and a predicted device-independent color space. The values of $\Delta XYZ_i$ data 504 that result in the least sum squared error may be output at step 406 as $\alpha_{SA}$ 407.

Step 506 of method 500 takes as input RGB 501 and other parameters 503 and generates linear RGB values (RGB)' 507. Alternatively, step 506 may take directly as input the linear values (RGB)' without the need for the other parameters 503 and step 506. Although any procedure for generating (RGB)' 507 may be used, (RGB)' 507 typically is calculated to be the corrected values of RGB 501 that achieve optimized predictions of XYZ 502 when multiplied by the appropriate RGB->XYZ matrix as described in the optimization processes above. In the case of a CRT, (RGB)' may be calculated by a form of gamma curve associated with the CRT, e.g., $R^\gamma$. In this case, the other parameters 503 are the parameters describing the gamma curve. More complex functions, beyond just using the gamma curve, may be required for greater accuracy or for LCD systems. In the case where the method 500 is used as step 406 in FIG. 4, the other parameters 503 may include one or more of the parameters in $\alpha_{TC}$ 403. For example, if the device-independent coordinates of a digital camera profile are to be adjusted, the camera's tone channel expressions $f_R$, $f_G$, $f_B$ (and associated $\alpha_{TC}$ 403 parameters as described with respect to step 402) may be used at step 506 to generate (RGB)' 507.

At step 508, correction factors $\beta$ 509 are generated for each color i corresponding to $\Delta XYZ_i$ 504. According to an embodiment of the present invention, the correction factors $\beta$ 509 are calculated using piecewise linear correction functions, such that a maximum of each of the piecewise linear correction functions occurs at a boundary condition of a corresponding device-dependent color space (RGB 501) and each piecewise linear correction function is linearly reduced to zero or approximately zero as values in the corresponding device-dependent color space approach either a different boundary condition or a neutral axis. Stated differently, the correction factors $\beta$ 509 are calculated, according to an embodiment of the present invention, such that (a) the piecewise linear correction function for a correction factor ($\beta$) and a color i is at a maximum when the current device-dependent color being evaluated is at a maximum distance from all other colors capable of being associated with i and the neutral axis, and (b) the piecewise linear correction function for a correction factor correction factor ($\beta$) and a color i scales linearly to zero as the device-dependent colors being evaluated approach another color capable of being associated with i or the neutral axis. For an illustration of what is meant by "associated," consider a color at the boundary condition $R_bG_bB_b$. Assume, for example, that a boundary condition is defined as all values of $R_bG_bB_b$ being either 0 or 1.0. An "adjacent" or "associated" color would be one in which only one of the colors is switched from 0 to 1 or from 1 to 0 from the current color. Thus, adjacent colors to $R_bG_bB_b$=(1,0,0) are (1,1,0) and (1,0,1). Adjacent colors to $R_bG_bB_b$=(1,1,0) are (1,0,0) and (0,1,0)

According to an embodiment of the present invention, $\beta_i$ 509 for i=0 to i=5 (i.e., for $R_0$, $G_0$, $B_0$, $C_0$, $M_0$, and $Y_0$) for values $\Delta XYZ_i$ 504 are calculated as follows. According to this embodiment, R, G, and B are assumed to be normalized to 1.0 so that $\beta$ is between zero and one, with maximum correction occurring at $\beta$=1.

| | |
|---|---|
| $RGB_{min}$ = min(R, G, B) | |
| $\beta_0$(R, G, B) = R − max(G, B) | for i = 0(R), R > G, R > B |
| $\beta_0$(R, G, B) = 0 | for i = 0(R), R < G or R < B |
| $\beta_1$(R, G, B) = G − max(R, B) | for i = 1(G), G > R, G > B |
| $\beta_1$(R, G, B) = 0 | for i = 1(G), G < R or G < B |
| $\beta_2$(R, G, B) = B − max(R, G) | for i = 2(B), B > G, B > R |
| $\beta_2$(R, G, B) = 0 | for i = 2(B), B < G or B < R |
| $\beta_3$(R, G, B) = min(G, B) − $RGB_{min}$ | for i = 3(C), R < G, R < B |
| $\beta_3$(R, G, B) = 0 | for i = 3(C), R > G or R > B |
| $\beta_4$(R, G, B) = min(R, B) − $RGB_{min}$ | for i = 4(M), G < R, G < B |
| $\beta_4$(R, G, B) = 0 | for i = 4(M), G > R or G > B |
| $\beta_5$(R, G, B) = min(R, G) − $RGB_{min}$ | for i = 5(Y), B < G, B < R |
| $\beta_5$(R, G, B) = 0 | for i = 5(Y), B > G or B > R |

For example, when i=0 (associated with red), $\beta_0$ is at a maximum when the current device-dependent color being evaluated (from (RGB)' 507) is at a maximum distance from all other colors capable of being associated with i (that is, green, blue, cyan, magenta, and yellow) and the neutral axis. In other words, $\beta_0$ is at a maximum when the green and blue components of the current device-dependent color (from (RGB)' 507) being evaluated are zero. The piecewise linear correction function for $\beta_0$ linearly scales to zero as the device-dependent colors being evaluated (from (RGB)' 507) approach green, blue, cyan, magenta, yellow, or the neutral axis. In other words, the linear correction function associated with $\beta_0$ linearly scales to zero as the green and blue components of the current device-dependent color (from (RGB)' 507) being evaluated increase.

At step 510, each of the individual device-independent changes $\Delta XYZ_i$ 504 is corrected by its corresponding correction factors $\beta_i$ 509. A total adjustment to be made to the device-independent data XYZ 502 is calculated as $\Delta XYZ_{total}$ 511. $\Delta XYZ_{total}$ 511 is calculated by summing each of the individually corrected device-independent changes $\Delta XYZ_i$ 504. According to an embodiment of the present invention, $\Delta XYZ_{total}$ 511 is calculated as follows.

$$\Delta XYZ_{total}(R, G, B) = \sum_{i=0}^{i=5} \beta_i(R, G, B)\Delta XYZ_i$$

At step 512, the device-independent data XYZ 502 is adjusted by $\Delta XYZ_{total}$ 511, thereby generating $XYZ_{adj}$ 505. According to an embodiment of the present invention, $XYZ_{adj}$ 505 is calculated as follows.

$$XYZ_{adj} = XYZ + \Delta XYZ_{total}$$

The following software code illustrates an implementation of the method 500, according to an embodiment of the present invention.

```
#define nRGBCMY 6
int iColor;
deltaXYZ=XYZ(0.0,0.0,0.0);
for (iColor=0; iColor<nRGBCMY; iColor++)
{
    corrFactor=calcCorrFactor (rgbLinear, iColor);
    deltaX=corrFactor*mDeltaX[iColor];
    deltaY=corrFactor*mDeltaY[iColor];
    deltaZ=corrFactor*mDeltaZ[iColor];
    deltaXYZtemp.x(deltaX); deltaXYZtemp.y(deltaY);
    deltaXYZtemp.z(deltaZ);
    deltaXYZ+=deltaXYZtemp;
}
xyzResult+=deltaXYZ;
double Camera_Model::calcCorrFactor(const
vRGB<double>&rgbVal, int corrColor)
{
    double corrFactor, minRGB;
    corrFactor=0.0;
    minRGB=min(rgbVal.r( ), min(rgbVal.g( ), rgbVal.b( )));
    if (corrColor==iRED)
    {
      if (rgbVal.r( )>rgbVal.g( ) &&
        rgbVal.r( )>rgbVal.b( ));
      {
        corrFactor=rgbVal.r( ) − max(rgbVal.g( ),
          rgbVal.b( ));
      }
      else
        corrFactor=0.0
    }
    else if (corrColor==iGRE)
    {
      if (rgbVal.g( )>rgbVal.r( ) &&
```

-continued

```
        rgbVal.g( )>rgbVal.b( ));
    {
        corrFactor=rgbVal.g( ) – max(rgbVal.r( ),
            rgbVal.b( ));
    }
    else
        corrFactor=0.0
}
else if (corrColor==iBLU)
{
    if (rgbVal.b( )>rgbVal.g( ) &&
        rgbVal.b( )>rgbVal.r( ));
    {
        corrFactor=rgbVal.b( ) – max(rgbVal.r( ),
            rgbVal.g( ));
    }
    else
        corrFactor=0.0
}
else if (corrColor==iCYAN)
{
    if (rgbVal.g( )>rgbVal.r( ) &&
        rgbVal.b( )>rgbVal.r( ));
    {
        corrFactor=min(rgbVal.g( ), rgbVal.b( )) –
            minRGB;
    }
    else
        corrFactor=0.0
}
else if (corrColor==iMAG)
{
    if (rgbVal.r( )>rgbVal.g( ) &&
        rgbVal.b( )>rgbVal.g( ));
    {
        corrFactor=min(rgbVal.r( ), rgbVal.b( )) –
            minRGB;
    }
    else
        corrFactor=0.0
}
else if (corrColor==iYELL)
{
    if (rgbVal.r( )>rgbVal.b( ) &&
        rgbVal.g( )>rgbVal.b( ));
    {
        corrFactor=min(rgbVal.r( ), rgbVal.g( )) –
            minRGB;
    }
    else
        corrFactor=0.0
}
return(corrFactor);
}
```

The method 500 may be used to improve the process of soft proofing on a display. In order to determine the desired corrections for achieving such improved soft proofing, the magnitude and direction of the corrections can be estimated by correcting a display profile A->display profile A' in the desired direction of improvement and then converting colors from the corrected display profile A'->display profile A. For example, if an operator desires to shift the hue of yellow in a displayed image towards red, a value of $\Delta(XYZ)_5$ (yellow), which equates to a hue shift of 3 delta E towards red for saturated yellow, can be used. If the operator confirms that the desired result has occurred, the RGB profile of the display may now be corrected in an inverse manner to ensure that images rendered to the screen will have the desired red shift in the yellows. This may be accomplished to reasonable accuracy by adjusting the display profile A with a value of $\Delta(XYZ)_5$ (yellow), which is the negative of the above correction.

Similarly, the method 500 may be used to perform device independent color space correction. For instance, an original RGB profile (profile A1) may be modified according to the method 500 to generate a new profile (profile A2). XYZ corrections may be performed by following the standard color management path of XYZ->RGB(profileA1)->RGB(profileA2)->(XYZ)'. Combining multiple conversions into a single conversion is well-known in the art and is called concatenation of profiles. The XYZ->(XYZ)' result is known as an abstract profile.

Another application for the method 500, as discussed above with reference to FIGS. 3 and 4 is for digital-image input device (such as a scanner or a digital camera) profiling. The method 500 may permit adequate correction to be applied to a generic RGB profile for a digital camera or scanner in order to preserve gray balance and good overall image integrity, but also improvement to the predictive conversion of RGB->XYZ or L*a*b* for a specific object in an image having intense color. The values of the corrections to the angle, saturation, and luminance for RGBCMY may be automatically calculated by an error minimizing routine.

Unlike other techniques, the method 500 uses piecewise linear functions that may be used to correct both small color discrepancies, i.e., on the order of 2-3 delta E, or large color discrepancies, i.e., on the order of 20-30 delta E.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

| PARTS LIST | |
|---|---|
| 101 | object |
| 102 | input device |
| 103 | device-dependent data RGB |
| 104 | color profile |
| 105 | device-independent data XYZ |
| 106 | output device color profile |
| 107 | device-independent data CMYK |
| 108 | output device |
| 109 | representation of object 101 |
| 200 | system |
| 202 | input device |
| 204 | computer system |
| 206 | data storage system |
| 208 | operator |
| 210 | optional devices/computers |
| 300 | method |
| 301 | XYZ data |
| 302 | step |
| 303 | RGB data |
| 304 | step |
| 305 | RGB-XYZ |
| 306 | step |
| 307 | GrayPatches |
| 308 | step |
| 309 | Brightest Patch |
| 310 | step |
| 311 | $\alpha_{ILLCORR}$ |
| 312 | step |
| 313 | RGB-XYZ$_{ILLCORR}$ |
| 314 | step |
| 315 | parameters |
| 316 | step |
| 317 | profile |
| 402 | step |
| 403 | parameters $\alpha_{TC}$ |
| 404 | step |
| 405 | parameters $\alpha_C$ |

-continued

PARTS LIST

| | |
|---|---|
| 406 | step |
| 407 | parameters $\alpha_{SA}$ |
| 408 | step |
| 409 | adjusted $\alpha_C$ parameters $\alpha_C'$ |
| 410 | adjusted $\alpha_{TC}$ parameters $\alpha_{TC}'$ |
| 411 | adjusted $\alpha_{SA}$ parameters $\alpha_{SA}'$ |
| 500 | method |
| 501 | device-dependent data "RGB" |
| 502 | device-independent data "XYZ" |
| 503 | other parameters |
| 504 | changes to selected regions of color "$\Delta XYZ_i$" |
| 505 | adjusted device-independent data $XYZ_{adj}$ |
| 506 | step |
| 507 | adjusted device-dependent data (RGB)' |
| 508 | step |
| 509 | correction factors $\beta$ |
| 510 | step |
| 511 | total changes to device-independent data $\Delta XYZ_{total}$ |
| 512 | step |

What is claimed is:

1. A method for profiling a digital-image input device comprising:
an image of a color chart on the digital input device;
estimating an illumination of the color chart;
generating a profile independent of a relative exposure of the color chart with respect to other portions of the image outside of the color chart;
determining device-dependent coordinate values for the image of the color chart;
linearly scaling device-independent coordinate values of the color chart based at least on a scaling factor; and
calculating first parameters describing tone curves of the digital-image input device based at least on the linearly scaled device-independent coordinate values.

2. The method of claim 1, wherein the scaling is performed using a scaling factor comprising a ratio of the estimated illumination of the color chart and a measured illumination of the color chart.

3. The method of claim 2, wherein linearly scaling the device-independent coordinate values comprises linearly increasing the device-independent coordinate values when the estimated illumination is high compared to the measured illumination.

4. The method of claim 2, wherein linearly scaling the device-independent coordinate values comprises linearly decreasing the device-independent coordinate values when the estimated illumination is low compared to the measured illumination.

5. The method of claim 1 further comprising:
calculating second parameters describing chromaticities of the profile based at least on the linearly scaled device-independent coordinate values.

6. A method for generating a profile for a digital-image input device, the method comprising:
capturing an image of a color chart with the digital-image input device, wherein the color chart comprises a plurality of color patches;
determining device-dependent coordinate values of each of the plurality of color patches of the image;
estimating an illumination of a brightest gray patch of the plurality of color patches based at least on the device-dependent coordinate values;
linearly scaling device-independent coordinate values for each of the plurality of color patches based at least on the estimated illumination;
generating the profile for the digital-image input device based at least on the linearly scaled device-independent coordinate values or a derivative thereof; and
storing the profile in a computer-accessible memory.

7. The method of claim 6, wherein the profile is generated independently from of a relative exposure of the color chart with respect to other portions of the image outside of the color chart.

8. The method of claim 6, further comprising identifying gray patches within the color chart based at least on the device-independent coordinate values for each of the plurality of color patches.

9. The method of claim 8, wherein identifying the gray patches comprises:
comparing the device-independent coordinate values for each of the plurality of color patches with a predefined grey value; and
assigning each of the plurality of color patches as a gray patch when the device-independent coordinate values are less than the gray value.

10. The method of claim 9, wherein the gray value is approximately equal to 5 delta E.

11. The method of claim 6, wherein linearly scaling the device-independent coordinate values comprises:
calculating a scaling factor based at least on a ratio of the estimated illumination of the brightest gray patch and a measured illumination of the brightest gray patch; and
applying the scaling factor to the device-independent coordinate values.

12. The method of claim 11, wherein the measured illumination is based at least on device-independent coordinate values of the brightest gray patch.

13. The method of claim 6, further comprising the steps of:
calculating first parameters describing tone curves of the digital-image input device based at least on the linearly scaled device-independent coordinate values; and
selectively adjusting the linearly scaled device-independent coordinate values or a derivative thereof using a piecewise linear correction function,
wherein the selectively adjusted device-independent coordinate values are a derivative of the linearly scaled device-independent coordinate values, and
wherein the generating step also generates the profile based at least on the first parameters.

14. The method of claim 13, wherein calculating the first parameters comprises applying device-dependent coordinate parameters to the device-dependent coordinate values to predict device-independent coordinate values.

15. The method of claim 14, further comprising adjusting the device-dependent coordinate parameters to minimize an error between predicted device-independent coordinate values from the device-dependent coordinate values and the linearly scaled device-independent coordinate values for each of the gray patches of the color chart.

16. The method of claim 14, wherein the device-dependent coordinate parameters comprise a black bias offset, a linear scaling factor, and a gamma for each of the device-dependent coordinates.

17. The method of claim 14, wherein the device-dependent coordinate parameters comprise a black bias offset, a linear scaling factor for each of the device-dependent coordinates, and a single gamma for the device-dependent coordinates.

18. The method of claim 13, wherein the piecewise liner correction function is defined such that a maxima of the piecewise linear correction function occurs at a boundary condition of a corresponding device-dependent color space and the piecewise linear correction function is linearly reduced to zero or approximately zero as values in the corresponding device-dependent color space approach either a different boundary condition or a neutral axis.

19. The method of claim 14, further comprising the step of calculating second parameters describing chromaticities of the profile based at least on the linearly scaled device-independent coordinate values, wherein the generating step also generates the profile based at least on the second parameters.

20. A method for generating a profile for a digital-image input device, the method comprising:
   capturing an image of a color chart with the digital-image input device, wherein the color chart comprises a plurality of color patches;
   determining device-dependent coordinate values of each of the plurality of color patches of the image;
   estimating an illumination of a brightest gray patch of the plurality of color patches based at least on the device-dependent coordinate values;
   linearly scaling device-independent coordinate values for each of the plurality of color patches based at least on the estimated illumination;
   calculating first parameters describing tone curves of the digital-image input device based at least on the linearly scaled device-independent coordinate values;
   calculating second parameters describing chromaticities of the profile based at least on the linearly scaled device-independent coordinate values;
   selectively adjusting the linearly scaled device-independent coordinate values or a derivative thereof using a piecewise linear correction function;
   generating the profile for the digital-image input device based at least on the selectively-adjusted-linearly-scaled-device-independent coordinate values, the first parameters, and the second parameters, wherein the profile is generated independently from of a relative exposure of the color chart with respect to other portions of the image outside of the color chart; and
   storing the profile in a computer-accessible memory.

21. A computer-accessible memory comprising instructions that cause a programmable processor to:
   receive a captured image of a color chart with a digital-image input device, wherein the color chart comprises a plurality of color patches;
   determine device-dependent coordinate values for each of the plurality of color patches of the captured image;
   estimate an illumination of a brightest gray patch of the plurality of color patches based at least on the device-dependent coordinate values;
   linearly scale device-independent coordinate values for each of the plurality of color patches based at least on the estimated illumination; and
   generate a profile for the digital-image input device based at least on the linearly scaled device-independent coordinate values.

* * * * *